(12) United States Patent
Murray et al.

(10) Patent No.: US 10,324,975 B2
(45) Date of Patent: Jun. 18, 2019

(54) BULK KEYWORD MANAGEMENT APPLICATION

(71) Applicant: SmugMug, Inc., Mountain View, CA (US)

(72) Inventors: Craig Andrew Murray, San Jose, CA (US); Dan Wieme, Santa Ana, CA (US); Iria Tam, Sunnyvale, CA (US); Mike Diaz, Santa Clara, CA (US)

(73) Assignee: SMUGMUG, INC., Mountain View, CA (US)

( * ) Notice: Subject to any disclaimer, the term of this patent is extended or adjusted under 35 U.S.C. 154(b) by 529 days.

(21) Appl. No.: 14/964,324

(22) Filed: Dec. 9, 2015

(65) Prior Publication Data

US 2016/0179804 A1 Jun. 23, 2016

Related U.S. Application Data

(60) Provisional application No. 62/094,814, filed on Dec. 19, 2014.

(51) Int. Cl.
*G06F 16/48* (2019.01)
*G06F 17/30* (2006.01)

(52) U.S. Cl.
CPC .................................. *G06F 16/48* (2019.01)

(58) Field of Classification Search
CPC ......... G06F 17/30038; G06F 17/30867; G06F 17/30601

USPC ......................................................... 707/738
See application file for complete search history.

(56) References Cited

U.S. PATENT DOCUMENTS

| | | | |
|---|---|---|---|
| 7,028,253 B1 * | 4/2006 | Lieberman | G06F 16/58 715/232 |
| 2002/0188602 A1 | 12/2002 | Stubler et al. | |
| 2005/0091232 A1 | 4/2005 | Eschbach et al. | |
| 2007/0300158 A1 * | 12/2007 | Kasperkiewicz | G06F 16/40 715/731 |
| 2009/0177627 A1 | 7/2009 | Yoon et al. | |
| 2010/0074560 A1 | 3/2010 | Wagner et al. | |
| 2013/0326338 A1 | 12/2013 | Secord et al. | |
| 2015/0363503 A1 * | 12/2015 | Scheuerman | G06F 17/2235 715/202 |
| 2016/0179760 A1 * | 6/2016 | Strong | G06F 3/0482 715/788 |

* cited by examiner

*Primary Examiner* — Jean B Fleurantin
(74) *Attorney, Agent, or Firm* — Patterson + Sheridan, LLP

(57) ABSTRACT

Embodiments described herein generally relate to a bulk keyword management application. The bulk keyword management application allows a user to associate a plurality of keywords with a plurality of media items at once. The plurality of keywords may be searchably associated with the plurality of media items. Associating keywords to media items in bulk effectively organizes a gallery of media items in a time efficient manner, making the gallery easy to navigate through a search means.

18 Claims, 6 Drawing Sheets

BULK KEYWORD MANAGEMENT APPLICATION

CROSS-REFERENCE TO RELATED APPLICATIONS

This application claims benefit to U.S. Provisional Patent Application No. 62/094,814, filed Dec. 19, 2014, the entirety of which is herein incorporated by reference.

BACKGROUND

Field

Embodiments described herein generally relate to a method of organizing media items in a gallery. More specifically, embodiments provided herein relate to a bulk keyword management application.

Description of the Related Art

The Internet has gained prevalence in today's society enjoyed by few other technologies. The backbone of the Internet is the almost countless number of websites that can be accessed by users around the world. Many websites present media galleries, such as photo/video galleries, allowing anyone who has access to the website to view the media gallery. This allows people to easily share their personal information, news, photos, videos and many other types of media in a gallery through a website. The evolution of media galleries has resulted in a demand from users that the galleries are easy to organize and navigate.

A user may upload hundreds or thousands of media items at a time, which may all then be presented in a single gallery. The media items may be uploaded haphazardly, without any discernible organizational strategy, which results in the gallery being displayed in a chaotic and disorganized manner. A common way many users choose to organize galleries is by associating keywords with the media items. By doing so, the user may search the keyword and in response, the associated media items may be located and presented. However, associating one or more keywords with the hundreds or thousands of media items in the gallery can be quite time consuming and may require a substantial amount of user effort. Often times, a user must manually associate each individual keyword with each individual media item one at a time. This method of associating keywords is inefficient, and could result in errors which would prevent the media item from being displayed when a keyword is searched. For example, a user may capitalize a keyword on one media item, but forget to do so for another media item.

Therefore, what is needed in the art is an application for organizing media items in a gallery by associating a plurality of media items with a plurality of keywords at one time with minimal input or effort.

SUMMARY

Embodiments described herein generally relate to a bulk keyword management application. The bulk keyword management application allows a user to associate a plurality of keywords with a plurality of media items at once. The plurality of keywords may be searchably coupled to the plurality of media items. Associating keywords to media items in bulk effectively organizes a gallery of media items in a time efficient manner, making the gallery easy to navigate through a search means.

In one embodiment, a method of associating keywords with a plurality of media items is provided. The method may include providing a keyword management tool, the keyword management tool comprising a keyword entry application and a keyword bank application. The method further includes receiving a first selection of a plurality of media items displayed in a gallery, receiving a first input of one or more keyword selections in the keyword management tool to be associated with the plurality of media items, and associating the one or more keyword selections to the first selection of the plurality of media items. The one or more keyword selections may be searchably associated with the plurality of media items.

In another embodiment, a computer readable storage medium may be provided. The computer readable storage medium may store instructions that when executed by a processor, cause the processor to associate keywords with a plurality of media items by performing the steps of providing a keyword management tool comprising a keyword entry application and a keyword bank application, receiving a first selection of a plurality of media items displayed in a gallery, receiving a first input of one or more keyword selections in the keyword management tool to be associated with the plurality of media items, and associating the one or more keyword selections to the first selection of the plurality of media item. The one or more keyword selections may be searchably associated with the plurality of media items.

In yet another embodiment, a computer system for associating keywords with a plurality of media items may be provided. The computer system may include a processor and a memory. The memory may store instructions that, when executed by the processor, cause the computer system to provide a keyword management tool comprising a keyword entry application and a keyword bank, receive a first selection of a plurality of media items displayed in a gallery, receive a first input of one or more keyword selections in the keyword management tool to be associated with the plurality of media items, and associate the one or more keyword selections to the first selection of the plurality of media items. The one or more keyword selections may be searchably associated with the plurality of media items.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized in other embodiments without specific recitation.

DETAILED DESCRIPTION

Embodiments described herein generally relate to a bulk keyword management application. The bulk keyword management application allows a user to associate a plurality of keywords with a plurality of media items at once. The plurality of keywords may be searchably associated with the plurality of media items. Associating keywords to media items in bulk effectively organizes a gallery of media items in a time efficient manner, making the gallery easy to navigate through a search means.

The term "user" as used herein includes, for example, a person or entity that owns a computing device or a wireless device; a person or entity that operates or utilizes a computing device or a wireless device; or a person or entity that is otherwise associated with a computing device or a wireless device. It is contemplated that the term "user" is not intended to be limiting and may include various examples beyond those described.

The term "media" or "media item" as used herein includes, for example, messages, photos, videos, audio, blogs, advertisements, geotags, notifications, and various other types of media which may be consumed by a user. The term "experience" as used herein may include media or media items associated with a geographical location. It is contemplated that the terms "media," "media item," or "experience" are not intended to be limiting and may include various examples beyond those described.

The term "metadata" as used herein includes, for example, technical characteristics, such as aspect ratio, image type, camera type, lens type, pixels per photo, resolution, display pixel density, shutter speed, f stop, iso, color balance, manufacturer data; event/transactional characteristics, such as digital watermarking and non-destructive editing data; derived characteristics, such as metadata derived by interpreting existing metadata or calculating new metadata; descriptive/classification characteristics, such as captions, keywords, location, image categories, etc; automation characteristics, segmentation characteristics; security characteristics; discovery characteristics; history characteristics; business characteristics; and process characteristics. Metadata may be embedded in content or similarly attached to content. It is contemplated that the term "metadata" is not intended to be limiting and may include various examples beyond those described.

Figure 1:
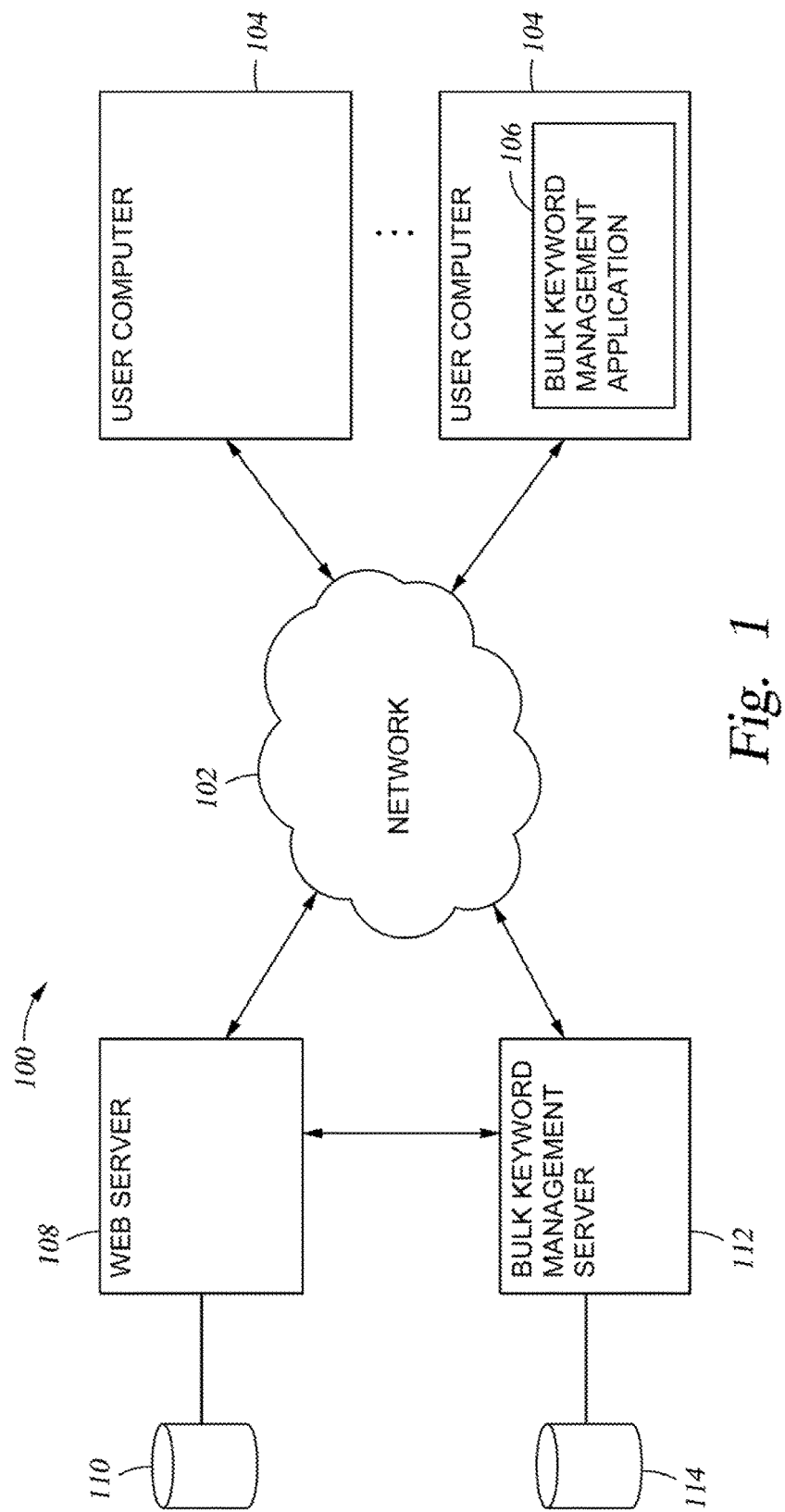
FIG. 1 illustrates a computer system configured for providing a website having a bulk keyword management application.

FIG. 1 illustrates a computer system 100 configured for providing a bulk keyword management application. As shown, the computing system 100 may include a web server 108, a bulk keyword management server 112, and a plurality of user computers 104 (only two of which are shown for clarity), each connected to a communications network 102 (e.g. the Internet). For example, the web server 108 may be programmed to communicate with the user computers 104 and the bulk keyword management server 112 using a networking protocol such as TCP/IP protocol. The bulk keyword management server 112 may communicate directly with the user computers 104 through the communications network 102.

Each user computer 104 may include conventional components of a computing device, e.g., a processor, system memory, a hard disk drive, input devices such as a mouse and a keyboard, and/or output devices such as a monitor, and/or a combination input/output device such as a touchscreen which not only receives input but also displays an output. The web server 108 and the bulk keyword management server 112 may include a processor and a system memory (not shown), and may be configured to manage web pages and other media content stored in its respective content storage unit 110 and 114 using a file system and/or relational database software. The bulk keyword management server 112 may be a web server configured to manage content metadata and heuristic characteristics stored in its respective content storage unit 114. The bulk keyword management server 112 may be configured to receive input from a user, such as rearranging content or adding content to user's website and automatically scale and arrange the content within the website in an efficient and aesthetically pleasing manner.

In the embodiments described below, users are respectively operating the user computers 104 that may communicate over the network 102 to request webpages and other media content data from the bulk keyword management server 112. Each user computer 104 may be configured to execute a software application, such as a bulk keyword management application 106, and access webpages and/or media content data managed by the bulk keyword management server 112 by specifying a uniform resource locator (URL) for the bulk keyword management server 112 into the bulk keyword management application 106. The bulk keyword management application 106 may be operably associated with a browser application configured to access the bulk keyword management server 112 via the network 102. The webpages that are displayed to a user may be transmitted from the bulk keyword management server 112 to the user's computer 104 and processed by the bulk keyword management application 106 for display through a GUI of the user's computer 104.

In one example, a webpage displayed on the user's computer 104 may be the user's own customized website. The user's computer 104 may access the bulk keyword management server 112 which, in turn, retrieves the user's website from storage 114, and causes the user's website to be displayed on the user's computer 104 in an efficient and aesthetically pleasing manner. The user's website may be managed by the user with a username and password combination, or other similar restricted access/verification required access methods, which allow the user to "log in" and make changes within the website. Changes or alterations made by the user to their website on the user computer 104 may be transmitted through the communications network 102 to the bulk keyword management server 112. The bulk keyword management server 112 may transfer the user's website to storage 114 where it may be retrieved and viewed by any other users with access to the Internet. It is contemplated that the webpage displayed may also be any webpage accessed by the user. Thus, the bulk keyword management application 106 described below may be applicable to various types of websites and software.

It is noted that the user computer 104 may be a personal computer, laptop, mobile computing device, smart phone, video game console, home digital media player, network-connected television, set top box, and/or other computing devices having components suitable for communicating with the communications network 102. The user computer 104 may also execute other software applications configured to receive website content and bulk keyword management information from the bulk keyword management server 112, such as, but not limited to, metadata, heuristics, media display software, media players, computer and video games, and/or widget platforms.

Figure 2:
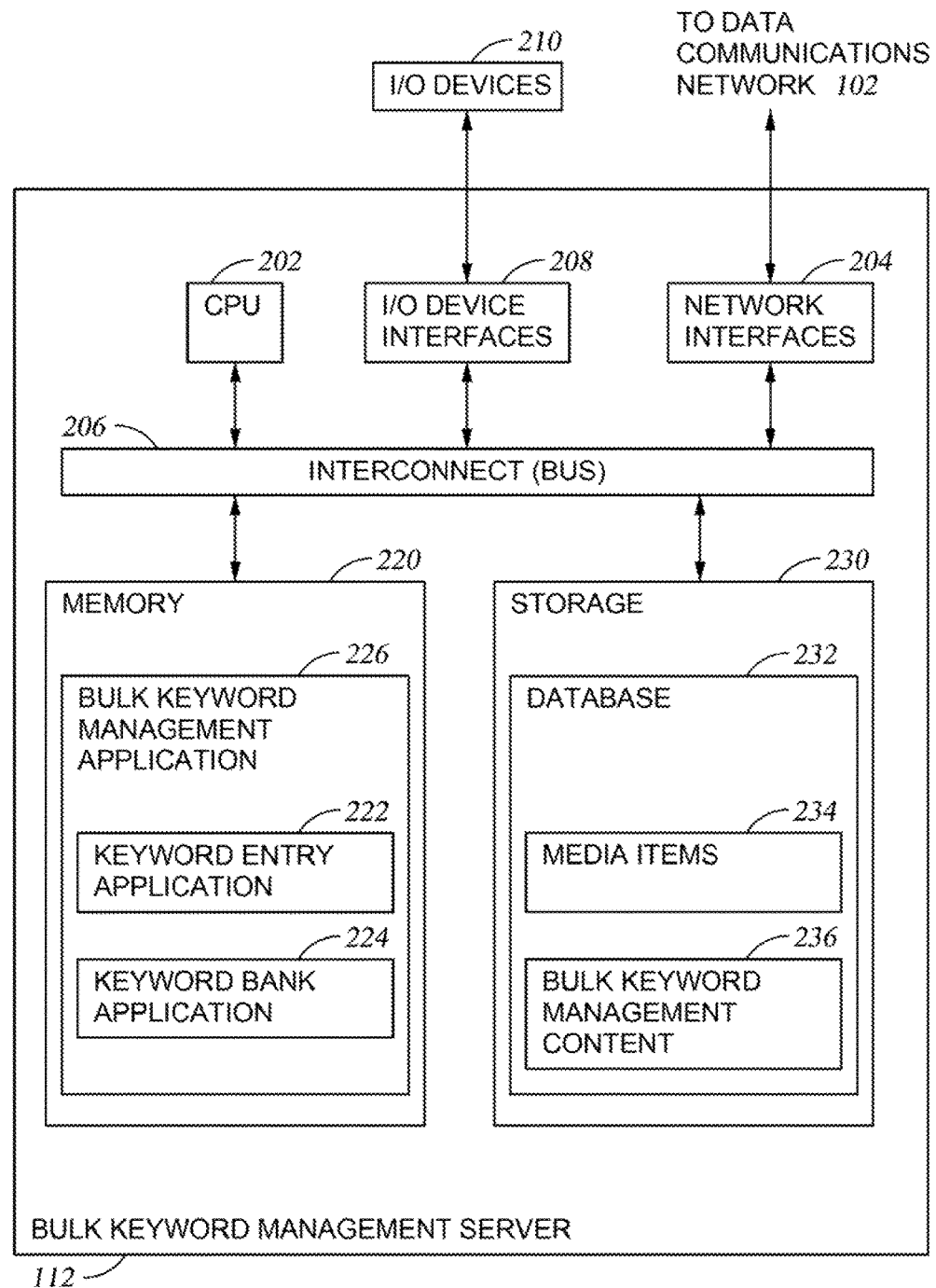
FIG. 2 illustrates a more detailed view of a server of FIG. 1.

FIG. 2 illustrates a more detailed view of the bulk keyword management server 112 of FIG. 1. The bulk keyword management server 112 includes, without limitation, a central processing unit (CPU) 202, a network interface 204, memory 220, and storage 230 communicating via an interconnect bus 206. The bulk keyword management server 112 may also include I/O device interfaces 208 connecting I/O devices 210 (e.g., keyboard, video, mouse, audio, touchscreen, etc). The network interface 204 may be configured to transmit data via the communications network 102.

The CPU 202 retrieves and executes programming instruction stored in the memory 220 and generally controls and coordinates operations of other system components. Similarly, the CPU 202 stores and retrieves application data residing in the memory 220. The CPU 202 is included to be representative of a single CPU, multiple CPU's, a single CPU having multiple processing cores, and the like. An interconnect 206 is used to transmit programming instructions and application data between the CPU 202, I/O device interfaces 208, storage 230, network interface 204, and memory 220.

The memory 220 is generally included to be representative of a random access memory and, in operation, stores software applications and data for use by the CPU 202. Although shown as a single unit, the storage 230 may be a combination of fixed and/or removable storage devices, such as fixed disk drives, floppy disk drives, hard disk drives, flash memory storage drives, tape drives, removable memory cards, CD-ROM, DVD-ROM, Blu-Ray, HD-DVD, optical storage, network attached storage (NAS), or a storage area-network (SAN) configured to store non-volatile data.

The memory 220 may store instructions and logic for executing a bulk keyword management application 226. The bulk keyword management application 226 may include analytic applications, such as a keyword entry application 222 and a keyword bank application 224, among other applications. The storage 230 may store various website content and may include a database 232 configured to store data for displaying a website with associated instructions according to techniques described herein, such as media items 234 and bulk keyword management content 236. The database 232 may also store data relating to display characteristics for providing the user with a website that displays content in an efficient and aesthetically pleasing manner. The database 232 may be any type of storage device.

Figure 3:
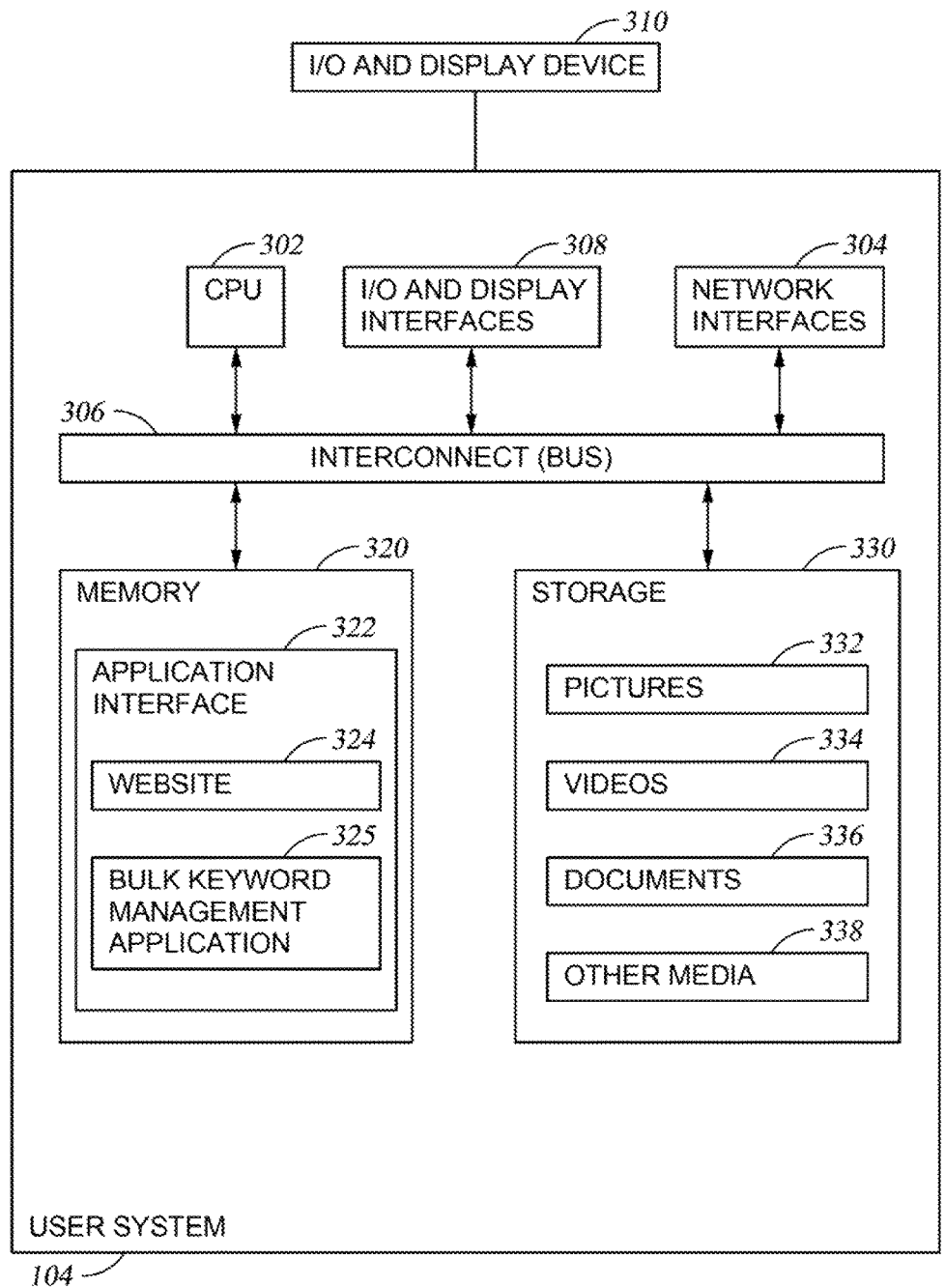
FIG. 3 illustrates a user computing system used to access a website and utilize a bulk keyword management application.

FIG. 3 illustrates a more detailed view of the user computing system 104 used to access the bulk keyword management server 112 within a website, such as the user's own website. The user computing system 104 may include, without limitation, a central processing unit (CPU) 302, a network interface 304, an interconnect 306, a memory 320, and storage 330. The computing system 104 may also include an I/O device interface 308 connecting I/O devices 310 (e.g. keyboard, display, touchscreen, and mouse devices) to the computing system 104.

Like CPU 202, CPU 302 is included to be representative of a single CPU, multiple CPU's, a single CPU having multiple processing cores, etc., and the memory 320 is generally included to be representative of a random access memory. The interconnect 306 may be used to transmit programming instructions and application data between the CPU 302, I/O device interfaces 308, storage 330, network interface 304, and memory 320. The network interface 304 may be configured to transmit data via the communications network 102, e.g. to stream content from the bulk keyword management server 112, as well as to receive and present the user's website or gallery. Storage 330, such as a hard disk drive or solid-state storage drive (SSD), may store non-volatile data. The storage 330 may contain pictures 332, videos 334, documents 336, and other media 338 which can be any type of media that may be published to a website. Illustratively, the memory 320 may include an application interface 322, which itself displays a website 324 with media associated with a bulk keyword management application 325. The application interface 322 may provide a software application which allows the user to access web pages and other content hosted by the bulk keyword management server 112. The application interface 322 may also allow any user of the user computer system 104 to access any website available on the Internet.

Figure 4:
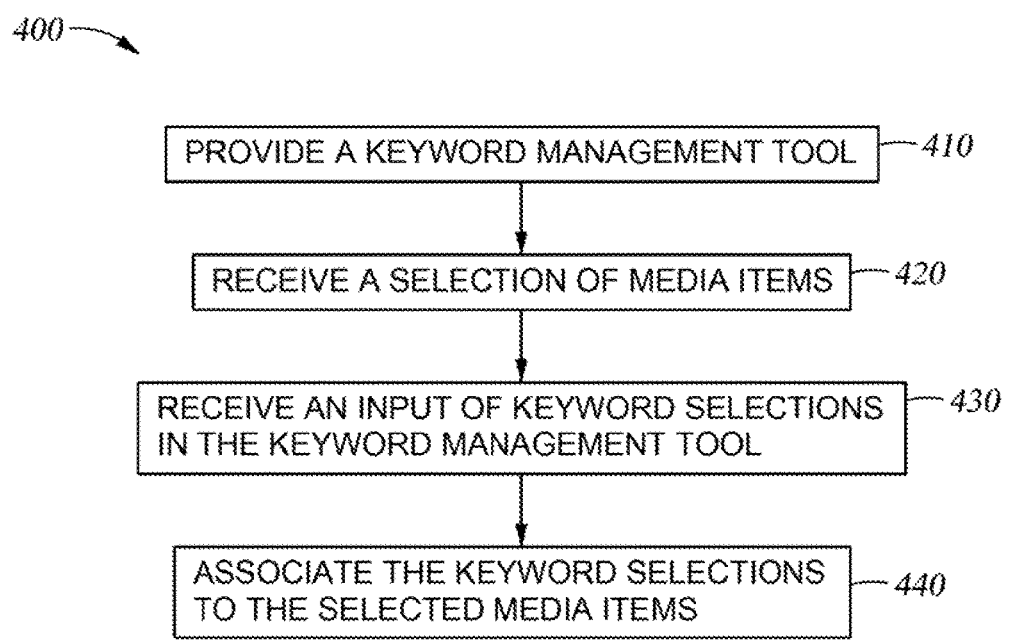
FIG. 4 is a schematic flow chart illustrating a method of associating keywords with a plurality of media items.

FIG. 4 is a schematic flow chart 400 depicting the bulk keyword management application 325 receiving input and associating keywords with media items in response to the input. At operation 410, the bulk keyword management application provides a keyword management tool which may include a keyword entry application and a keyword bank application. The keyword management tool may be displayed and be accessible to a user when the user is viewing a media item gallery.

At operation 420, the bulk keyword management application receives a selection of media items. The media items may be displayed in the gallery, and may be selected by a user. One or more media items may be selected. In one embodiment, a plurality of media items is selected. The one or more media items selected may have a common variable between them, such as a common metadata variable or similar image features. Common metadata variables may include location, date, time, and formatting variables, among others.

At operation 430, an input of keyword selections is received in the keyword management tool. The keyword selections may be manually added by the user through the keyword entry application, or the keyword selections may be displayed in and chosen from the keyword bank application. One or more keyword selections may be received by the keyword management tool to be associated with the selected media items of operation 420. The keyword selections may describe the common variable between the one or more media items.

At operation 440, the keyword selections are associated with the selected media items. In one embodiment, a plurality of keyword selections are associated with a plurality of selected media items. The keyword selections may be searchably associated with the one or more media items.

Figure 5:
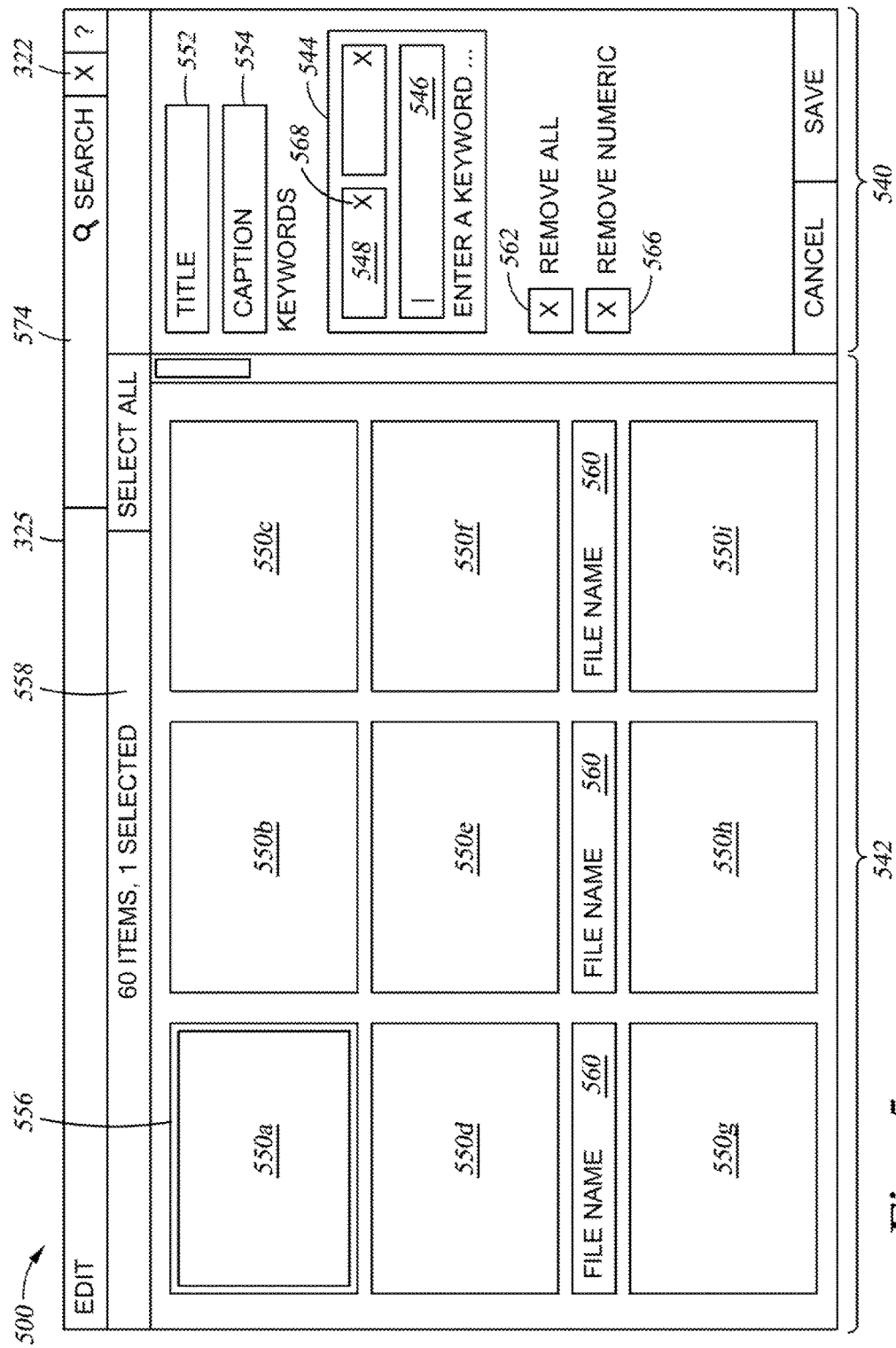
FIG. 5 illustrates a bulk keyword management application having a keyword management tool including a keyword entry application according to one embodiment.

FIG. 5 illustrates an example of a GUI 500 displaying the bulk keyword management application 325 in the application interface 322. The bulk keyword management application 325 is comprised of a keyword management tool 540 and a gallery 542. It is contemplated that both the keyword management tool 540 and the gallery 542 may function in concert with one another or the keyword management tool 540 and the gallery 542 may function and exist separately from one another. The gallery 542 may be a media item gallery comprising one or more media items 550a-550i, such as photos, videos, audio, messages, blogs, advertisements, geotags, and notifications, among others. While nine media items are shown, it is contemplated that the gallery 542 may contain any number of media items. The keyword management tool 540 may include a keyword entry application 544. The keyword entry application 544 may include a keyword entry means 546 and one or more keywords 548 associated with at least one media item 550a-550i. Generally, a keyword may be a descriptive term, identifier or other descriptive data feature associated with the media item. The keyword entry application 544 may display all keywords 548 associated with each of media items 550a-550i. In one embodiment, an input of keyword selections is received via the keyword entry application 544. The bulk keyword management tool 540 may display information about the one or more media items 550a-550i, such as a title 552 and a caption 554. The user may edit the title 552 and/or the caption 554, or the user may choose to not include the title 552 and/or the caption 554.

A user may select one or more media items 550a-550i from the gallery 542 to associate keywords 548 with. The selected state of a media item may indicate that the media item is to be edited, such as by associating keywords 548 with the media items 550a-550i. The one or more selected media items 550a-550i may have a common variable between them, such as the media items having the same format, originating at the same or substantially the same geographic location or on the same date, or containing similar subject matter. If a user selects a media item, such as media item 550a, the media item 550a may be highlighted 556 or emphasized in some way. A highlight 556 may be any visually identifiable or distinct means that distinguishes a media item 550a-550i in some way. Additionally, a selection indicator 558 may tell the user how many media items are selected at a given time and how many total media items are included in the gallery 542. The selection indicator 558 is adapted to change in response to how many media items are selected at a given time. For instance, the selection indicator 558 in FIG. 5 indicates the gallery has 60 total media items, and of the 60 total media items, only one media item is selected.

Upon selection of the one or more media items 550a-550i, a keyword 548 may be input to associate, or link, the keyword 548 with the one or more selected media items 550a-550i. A user may input any keyword 548 into the keyword entry means 546 or the user may select a keyword 548 displayed in the keyword entry application 544 to make the keyword selection. The keywords 548 displayed in the keyword entry application 544 may be keywords 548 previously input by the user. In one embodiment, the keywords 548 displayed in the keyword entry application 544 may be keywords 548 already associated with at least one of the selected media items 550a-550i. The bulk keyword management application 325 receives the keyword selection and associates the keyword selection to the one or more selected media items 550a-550i. The bulk keyword management application 325 is adapted to associate a plurality of keyword selections to a plurality of selected media items. Thus, if a gallery contains hundreds or thousands of media items, linking a plurality of keywords to a plurality of media items at once may save a user a considerable amount of time and effort. In one embodiment, the user may select a keyword 548 in the keyword entry application 544 without first selecting one or more media items 550a-550i, which would allow the user to edit the keyword 548.

For example, the user may select a first group comprising two media items 550a and 550b. The user may then select the keyword "black and white" to be associated with the media items 550a, 550b via the keyword entry application 544. The user may then select a second group comprising five media items 550a, 550b, 550c, 550d, and 550e. Of the five media items 550a-550e in the second group, media items 550a and 550b are included in both the first group and the second group. The user may then select the keyword "California" to be associated to the five media items 550a-550e of the second group via the keyword entry application 544. Thus, media items 550a and 550b are associated with both keywords "black and white" and "California", while media items 550b-550e are associated with only the keyword "California". If the user were to search the term "California", all five media items 550a-550e may be displayed. If the user searched the terms "California" and "black and white", media items 550a and 550b may be displayed.

Once the one or more keywords 548 have been associated with the one or more media items 550a-550i, the one or more keywords 548 may be searchably associated to the one or more media items 550a-550i, allowing a user to easily navigate the gallery 542. The one or more keywords 548 may be searchably associated to the one or more media items 550a-550i such that the user may search the keywords 548 in a search means 574, and the media items 550a-550i associated with the keywords 548 would be displayed in response. The bulk keyword management application 325 may receive the input of the keyword into the search means 574 and display all corresponding media items 550a-550i.

The bulk keyword management application 325 also allows the user to dissociate keywords 548 from the media items 550a-550i. Upon selection of one or more media items 550a-550i by the user, the corresponding keywords 548 associated with the one or more selected media items 550a-550i may be displayed in the keyword entry application 544. The user may then select a first link 568 labeled "X" or "remove" associated with the keyword 548, which dissociates the keyword 548 from the corresponding one or more media items 550a-550i. The bulk keyword management application 325 receives the input from the first link 568 and subsequently dissociates the keyword 548 from the corresponding media items 550a-550i. In another embodiment, the user may select the first link 568 associated with the keyword 548 without first having to select one or more media items 550a-550i. All media items 550a-550i associated with the selected keyword 548 associated with the first link 568 would then be dissociated. Thus, the user may also dissociate keywords from media items in bulk, which may save time and effort on the user's part.

Media items in the gallery 542, such as the media items 550b-550d, may be displayed with a file name 560 displayed adjacent to the media items 550b-550d. In one embodiment, the associated keywords of a media item are displayed in the file name 560. The bulk keyword management tool 540 may include a second link 562 to remove all keywords associated with the media items 550b-550d. The bulk keyword management tool 540 may also include a third link 566 to remove all numeric keywords associated with the media items 550b-550d. A numeric keyword may be a keyword automatically applied to a media item by a device generating the media item, such as a digital camera. The numeric keyword may be representative of metadata associated with the media item. The numeric keyword may be a combination of numeric characters, alphabetic characters, and/or symbols. In one embodiment, the bulk keyword management application 325 uses analyzed metadata from the selected media items to automatically associate keywords with the media items. The metadata may include one or more variables, such as location, date, time, and formatting variables, among others.

Figure 6:
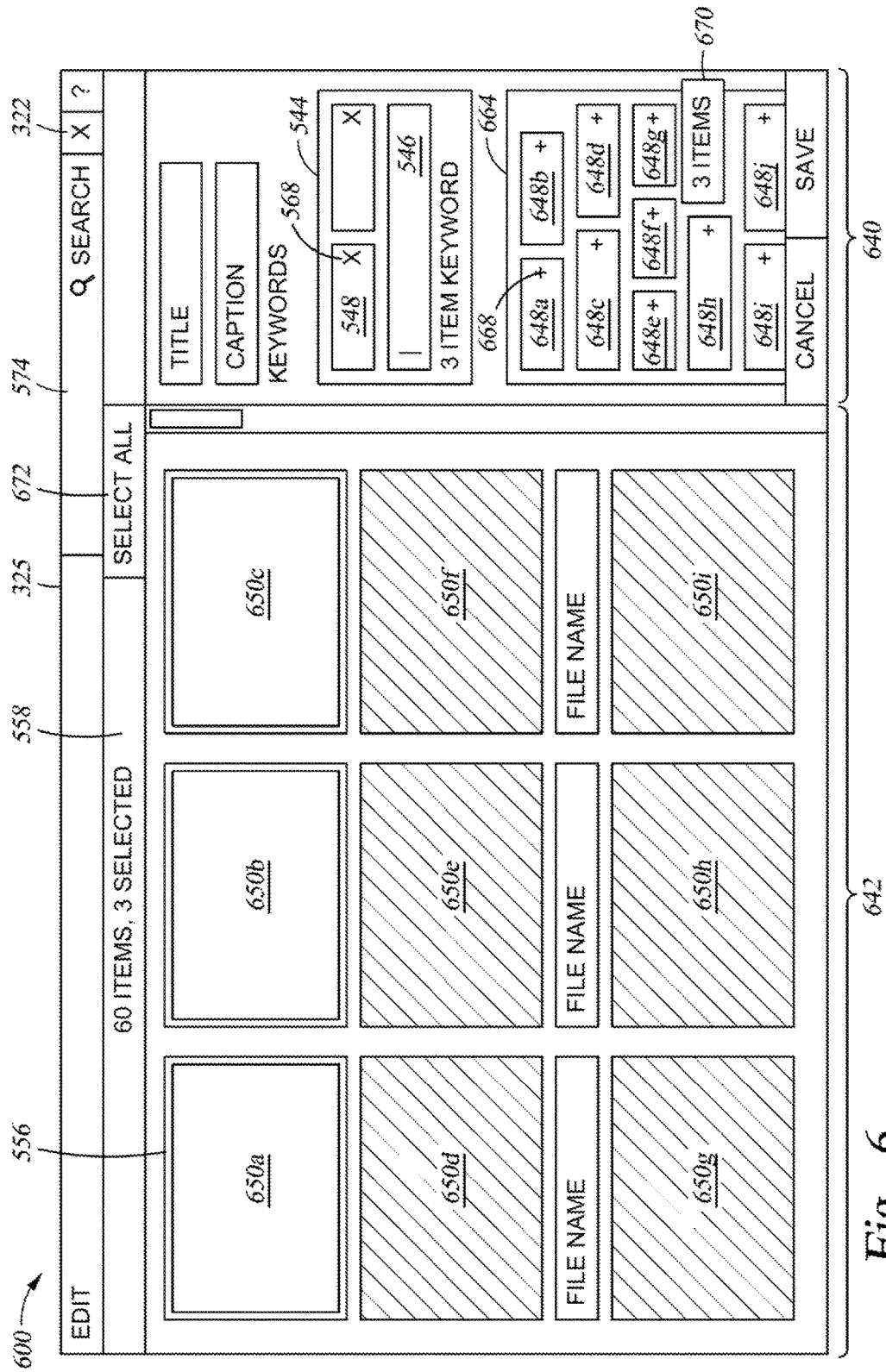
FIG. 6 illustrates a bulk keyword management application having a keyword management tool including a keyword bank application accordingly to one embodiment.

FIG. 6 illustrates another example of a GUI 600 displaying the bulk keyword management application 325 in the application interface 322. A keyword management tool 640 of FIG. 6 includes a keyword bank application 664 and the keyword entry application 544. The keyword management tool 640 may be the keyword management tool 540 described with regard to FIG. 5. The keyword bank application 664 displays a bank of one or more keywords 648a-648j. While ten keywords are shown, it is contemplated that the keyword bank application 664 may contain any number of keywords. The keywords 648a-648j may be keywords already associated with at least one media item 650a-650i in a gallery 642. While nine media items are shown, it is contemplated that the gallery 642 may contain any number of media items. In one embodiment, media items 650a-650i may be the media items 550a-550i displayed in the GUI 500 of FIG. 5. The gallery 642 may be the same as or similar to the gallery 542 of FIG. 5. The keywords 648a-648j in the keyword bank application 664 need not be applied to each media item within the gallery 642 to be displayed so long as each keyword 648a-648j is associated with at least one media item in the gallery 640. In one embodiment, an input of keyword selections is received via the keyword bank application 664.

The user may select a group of media items, such as a group of three media items 650a-650c. Upon selection of the three media items 650a-650c, the keyword bank application 664 may display keywords associated with at least one of the media items 650a-650c. The user may then either input a new keyword into the keyword entry means 546, or the user may select a keyword associated with one or more of the media items 650a-650c to apply to each selected media items 650a-650c. For example, the keyword "black and white" is associated to the media item 650a, while the keyword "California" is associated with the media items 650b and 650c. When the user selects media items 650a-650c, both keywords "black and white" and "California" may be displayed in the keyword bank application 664. The use may then select either keyword "black and white" or "California" to associate with the entire group of selected media items 650a-650c.

The keywords 648a-648j may be displayed in the keyword bank application 664 in an order based on how many media items are associated with each keyword 648a-648j. The keywords 648a-648j associated with the most media items may be listed at the top of the keyword bank application 664. For example, the keyword 648a may be associated with a greater or equal number of media items as the keyword 648b; the keyword 648b may be associated with a greater or equal number of media items as the keyword 648c, and so on. In another embodiment, the keywords 648a-648j may be displayed in the keyword bank application 664 in ascending alphanumeric order. In yet another embodiment, the keywords 648a-648j may be displayed in the keyword bank application 664 in descending alphanumeric order.

The user may associate a keyword 648a-648j to a plurality of media items 650a-650i using the keyword bank application 664. The user may select one or more media items 650a-650i to associate with one or more of keywords 648a-648j. For example, the user selects the media items 650a-650c to associate with the keyword 648a. The user may then select a fourth link 668 labeled "+" or "add" associated with the keyword 648a in the keyword bank application 664. By selecting the fourth link 668, the keyword 648a is associated to the selected media items 650a-650c. The bulk keyword management application 325 receives the keyword selection input from the user and subsequently associates the keyword 648a with the selected media items 650a-650c. In one embodiment, the selected media items 650a-650c are highlighted 556 for emphasis. The non-selected media items 650d-650i may be dimmed in response to the selection of media items 650a-650c. As such, the selected media items 650a-650c may be easily identified by the user.

The user may also associate a keyword to every media item 650a-650i in the gallery 642 at one time. In one embodiment, the user may select a fifth link 672 displayed adjacent to the gallery labeled "SELECT ALL". Selection of the fifth link 672 causes the bulk keyword management application 325 to select each media item 650a-650i in the gallery 642. The user may then enter a keyword in the keyword entry application 544 or the user may select a keyword from the keyword bank application 664. The selected keyword is then associated to each media item in the gallery 642 via the bulk keyword management application 325. Alternatively, the user may select the fourth link 668 associated with a desired keyword, such as the keyword 648a. Upon receipt of the user selection, the bulk keyword management application 325 may associate the selected keyword 648a to each media item 650a-650i in the gallery 642 automatically. The bulk keyword management application 325 receives the input of the fourth link 668 corresponding to the chosen keyword 648a, determines all media items 650a-650i are selected, and in response, associates the keyword 648a with each media item 650a-650i in the gallery 642. In one embodiment, the user may select a keyword in the keyword bank application 664, and in response, a numerical indication 670 representing a quantity of media items associated with the particular keyword is generated. In one embodiment, the corresponding media items associated with the selected keyword are highlighted in response to the displayed numerical indication 670. The non-corresponding media items may be dimmed to further emphasize which media items are associated with the selected keyword. For example, the user selects the keyword 648f from the keyword bank application 664. The user may select the keyword 648f by resting or hovering a pointer or cursor over the desired keyword 648f. In one embodiment, the user may select the keyword 648f by clicking or touching (on a touch sensitive GUI), and holding the click or touch until the numerical indication 670 is displayed. Upon selection of the keyword 648f by the user, the numerical indication 670 is displayed. In this example, the numerical indication 670 indicates three media items are associated with the keyword 648f. The three media items may be media items 650a, 650b, and 650c, and in response to the display of the numerical indication 670, media items 650a-650c may be highlighted 556. Furthermore, the non-corresponding media items 650d-650i may be dimmed to impart a greater emphasis on the corresponding media items 650a-650c.

In another embodiment, the user may select a media item 650a-650i by resting or hovering a pointer or cursor over the desired media item, and in response, the keywords associated with the selected media item are highlighted or distinguished in the keyword bank application 664 in some way. The non-corresponding keywords in the keyword bank application 664 may be dimmed to further emphasize which keywords are associated with the selected media item 650a-650i. In one embodiment, the user may select the media item by clicking or touching (on a touch sensitive GUI), and holding the click or touch until the corresponding keywords are displayed in the keyword bank application 664.

In sum, the bulk keyword management application provided allows a user to quickly and efficiently organize media items by associating a plurality of keywords with a plurality of media items at one time. The bulk keyword management application also allows a user to dissociate a plurality of keywords from a plurality of media items at one time. The keywords may be searchably associated to the media items, allowing a user to navigate the gallery through a search means.

While the foregoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure. Therefore, the scope of the present disclosure is determined by the claims that follow.

The invention claimed is:

1. A method of associating keywords with a plurality of media items, comprising:
    providing a keyword management tool, comprising:
        a keyword entry application; and
        a keyword bank application;
    receiving a first selection of a plurality of media items displayed in a gallery;
    receiving a first input of one or more keyword selections in the keyword management tool to be associated with the plurality of media items;
    linking the one or more keyword selections to all media items of the first selection of the plurality of media items via the keyword management tool in a single operation, wherein the one or more keyword selections are searchably associated with the plurality of media items, wherein at least one of the one or more keywords is automatically generated and linked to the plurality of media items based upon an analysis of metadata associated with the media items;
    receiving a second selection of the plurality of media items in the gallery;
    receiving a second input of one or more keyword selections to be dissociated with the second selection of the plurality of media items; and
    dissociating the one or more keyword selections to all the media items of the second selection of the plurality of media items in a single operation.

2. The method of claim 1, wherein the first input of the one or more keyword selections in the keyword management tool is received via the keyword entry application.

3. The method of claim 1, wherein the first input of the one or more keyword selections in the keyword management tool is received via the keyword bank application.

4. The method of claim 1, wherein selecting a first keyword in the keyword bank application generates a numerical indication representing a quantity of media items associated with the first keyword.

5. The method of claim 4, wherein the media items linked with the first keyword are highlighted in response to the selection of the first keyword in the keyword bank application.

6. The method of claim 5, wherein media items not linked with the first keyword are dimmed in response to the selection of the first keyword in the keyword bank application.

7. A non-transitory computer-readable storage medium, storing instructions that when executed by a processor, cause the processor to associate keywords with a plurality of media items, by performing the steps of:
    providing a keyword management tool, comprising:
        a keyword entry application; and
        a keyword bank application;
    receiving a first selection of a plurality of media items displayed in a gallery;
    receiving a first input of one or more keyword selections in the keyword management tool to be associated with the plurality of media items;
    linking the one or more keyword selections to all media items of the first selection of the plurality of media items via the keyword management tool in a single operation, wherein the one or more keyword selections are searchably associated with the plurality of media items, wherein at least one of the one or more keywords is automatically generated and linked to the plurality of media items based upon an analysis of metadata associated with the media items;
    receiving a second selection of the plurality of media items in the gallery;
    receiving a second input of one or more keyword selections to be dissociated with the second selection of the plurality of media items; and
    dissociating the one or more keyword selections to all the media items of the second selection of the plurality of media items in a single operation.

8. The non-transitory computer-readable storage medium of claim 7, wherein the first input of the one or more keyword selections in the keyword management tool is received via the keyword entry application.

9. The non-transitory computer-readable storage medium of claim 7, wherein the first input of the one or more keyword selections in the keyword management tool is received via the keyword bank application.

10. The non-transitory computer-readable storage medium of claim 7, wherein selecting a first keyword in the keyword bank application generates a numerical indication representing a quantity of media items associated with the first keyword.

11. The non-transitory computer-readable storage medium of claim 10, wherein the media items linked with the first keyword are highlighted in response to the selection of the first keyword in the keyword bank application.

12. The non-transitory computer-readable storage medium of claim 11, wherein media items not linked with the first keyword are dimmed in response to the selection of the first keyword in the keyword bank application.

13. A computer system for associating keywords with a plurality of media items, comprising:
    a processor; and
    a memory storing instructions that, when executed by the processor, cause the computer system to:

provide a keyword management tool, comprising:
  a keyword entry application; and
  a keyword bank application;
receive a first selection of a plurality of media items displayed in a gallery;
receive a first input of one or more keyword selections in the keyword management tool to be associated with the plurality of media items;
link the one or more keyword selections to all media items of the first selection of the plurality of media items via the keyword management tool in a single operation, wherein the one or more keyword selections are searchably associated with the plurality of media items, wherein at least one of the one or more keywords is automatically generated and linked to the plurality of media items based upon an analysis of metadata associated with the media items;
receive a second selection of the plurality of media items in the gallery;
receive a second input of one or more keyword selections to be dissociated with the second selection of the plurality of media items; and
dissociate the one or more keyword selections to all the media items of the second selection of the plurality of media items in a single operation.

14. The computer system of claim 13, wherein the first input of the one or more keyword selections in the keyword management tool is received via the keyword entry application.

15. The computer system of claim 13, wherein the first input of the one or more keyword selections in the keyword management tool is received via the keyword bank application.

16. The computer system of claim 13, wherein selecting a first keyword in the keyword bank application generates a numerical indication representing a quantity of media items associated with the first keyword.

17. The computer system of claim 16, wherein the media items linked with the first keyword are highlighted in response to the selection of the first keyword in the keyword bank application.

18. The computer system of claim 17, wherein media items not linked with the first keyword are dimmed in response to the selection of the first keyword in the keyword bank application.

* * * * *